INVENTORS
ROBERT S. EMSLIE
HUGH C. GULLEDGE
GEORGE L. LEWIS
OSWIN BURR WILLCOX

BY *Carl A. Hecht*

ATTORNEY

United States Patent Office 3,484,260
Patented Dec. 16, 1969

3,484,260
ALKALI METAL TITANATES-TiO$_2$ PIGMENTING COMPOSITIONS
Robert S. Emslie, Chadds Ford, Pa., Hugh C. Gulledge, Newark, and George L. Lewis, Wilmington, Del., and Oswin Burr Willcox, Landenberg, Pa., assignors to E. I. du Pont de Nemours and Company, Wilmington, Del., a corporation of Delaware
Continuation-in-part of application Ser. No. 279,580, May 10, 1963. This application June 13, 1967, Ser. No. 645,755
Int. Cl. C09c *1/36;* D21h *3/68*
U.S. Cl. 106—300    5 Claims

ABSTRACT OF THE DISCLOSURE

Paper and coating pigment compositions consisting of a mixture of 22 to 97% by weight of pigmentary titanium dioxide and 3% to 78% by weight of pigmentary, water-insoluble fibrous alkali metal titanates, particularly potassium and sodium titanate corresponding to the formula $M_2O(TiO_2)_n$ in which $n$ is 4–9 and M is an alkali metal, the particles of which titanate range from about 0.1 to 0.6 micron in cross-sectional diameter and have lengths of from 10 to 100 times said diameters.

CROSS REFERENCE TO RELATED APPLICATION

This application is a continuation-in-part of our co-pending application Ser. No. 279,580 filed May 10, 1963, and now U.S. Patent No. 3,328,117.

BACKGROUND OF THE INVENTION

U.S. Patents 2,833,620 and 2,841,470 disclose fibrous di-alkali metal titanates corresponding to the formula $M_2O(TiO_2)_n$ wherein $n$ is 6 to less than 8 in the former and 4 or 6 in the latter and M is an alkali metal (sodium, potassium, rubidium and cesium) and methods for the preparation of such titanates.

SUMMARY OF THE INVENTION

The composition of this invention comprises in combination from 22 to 97% by weight of pigmentary TiO$_2$ in either anatase or rutile crystalline form (or mixtures thereof) and from 3 to 78% by weight of pigmentary water insoluble fibrous alkali metal titanates corresponding to the formula $M_2O(TiO_2)_n$ in which the $n$ is 4–9 and M is an alkali metal, particularly sodium and potassium, the particles of which titanate are in predominantly pigment form, that is, have diameters ranging from about 0.1 to 0.6 micron and lengths of from 10 to 100 times said diameters, which compositions prove outstandingly useful in paper and coating composition applications to obtain improved pigment hiding power, opacity and light scattering ability in the igmenting ingredients when employed in the coating compositions such as paints and enamels and in papermaking.

DESCRIPTION OF THE PREFERRED EMBODIMENT

Figure 1:
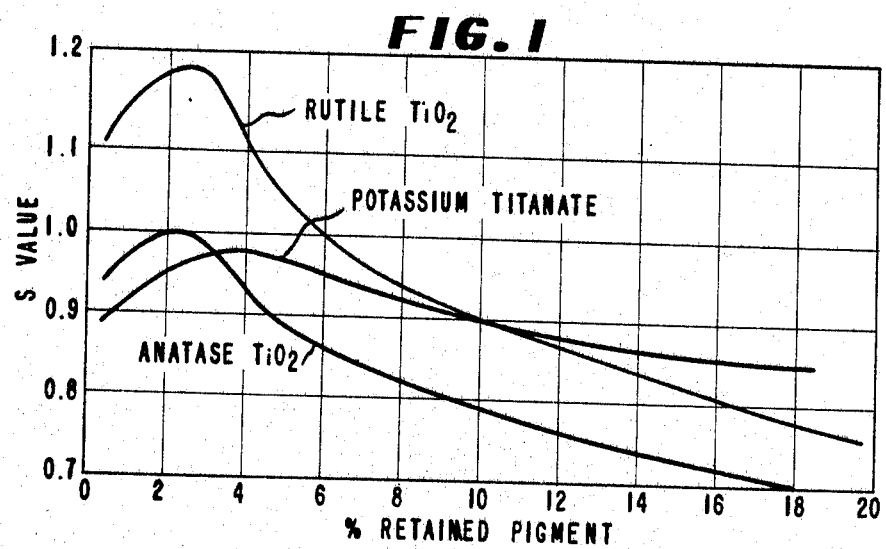
FIGURE 1 is a series of curves wherein light scattering of the pigment (S) as ordinate is plotted against percentage retained pigment as abscissa for each of rutile TiO$_2$, anatase TiO$_2$ and potassium titanate. The figure is referred to in greater detail in Example 2.

In practically applying the invention, specific concentrations or proportions of the contemplated opacifying pigmentary TiO$_2$ and pigmentary titanates are incorporated in a coating composition or paper formulations. This can be effected by means of separate addition of these components, but preferably the addition is in the form of a composite mixture obtained by previously dry or wet blending the desired proportions of such components in a suitable mixing vessel. In such addition or blending operations from about 3 to 78% by weight and preferably from about 3 to 20% by weight of fibrous pigmentary alkali metal titanate pigment is utilized, with the amount of pigmentary TiO$_2$ being from 22 to 97%, by weight, and preferably from about 80 to 97%, by weight, based on the total pigmenting composition.

The pigmentary TiO$_2$ component can comprise any type of commercially available TiO$_2$ pigment in either anatase, rutile or mixed crystallinity. Thus, anatase TiO$_2$ pigment such as results from the hydrolysis of a titanium sulfate solution in accordance with U.S. Reissue Patent 18,854, the hydrolysate from which is subsequently calcined in accordance with U.S. 1,892,693 is advantagously useful. Rutile type pigments which can be employed include those obtained from the vapor phase oxidation of titanium chloride in accordance with, for example, the disclosure of U.S. 2,488,439, U.S. 2,791,490 and U.S. 2,559,638.

The fibrous pigmentary dialkali metal titanate employed herein comprises a product containing a molar ratio of TiO$_2$/M$_2$O, in which M is an alkali metal, of from 4/1 to 9/1, and preferably ranges from 4/1 to 7/1. It has a predetermined diameter-to-length size and results from the calcination and reaction, at temperatures ranging from 850–975° C. under essentially dry, non-fluid conditions, of a previously dry-blended, compacted or nodular mixture of a basic, water-soluble oxygen compound of an alkali metal, such as a hydroxide, oxide, carbonate or salt and mixtures of said compounds, with an oxygen-containing titanium compound, such as titanium dioxide. In the calcination, a molar ratio of TiO$_2$/M$_2$O (M being an alkali metal) of from 2/1 to 8/1 is employed and from 5–45 parts by weight of an alkali metal chloride can also be present. Calcination is conducted until conversion to an alkali metal titanate is obtained, following which the products of reaction are filtered, washed, exfoliated and dried to recover the desired product having a particle size diameter ranging from 0.1 to 0.6 micron and a length ranging from 10 to 100 times said diameter, as determined by examination with an electron microscope at a magnification at 25,000 to 50,000 times actual size and measuring directly the enlarged image of the product. Thus, a dry, compacted reaction mixture or charge can be first prepared by dry blending the reactant components and then briquetting or otherwise converting the blend into lump or compacted form. The compacted charge as noted can consist of a mixture of a sodium or potassium hydroxide or carbonate with titanium dioxide, which, preferably, is in finely divided form for uniform dispersion throughout the mixture. The equivalent molar ratio of titanium compound to alkali metal compound, calculated as titanium dioxide, to the alkali metal compound, is variable, and can range from 2/1 to 8/1, but preferably ranges from 3/1 to 5/1.

Conversion of the compacted mixture to the required pigmentary form of titanate is then undertaken by calcining it at 850–975° C. in conventional furnacing means, such as a direct-fired batch or rotary kiln or shaft type furnace, and on a continuous basis over time periods ranging from about 0.25 to 16 hours, depending on the nature and composition of the dry reaction charge, and the particular temperatures and furnacing means utilized. For example, in the calcination, the reaction charge can be continuously fed to the cooler end of a direct-fired rotary kiln or shaft furnace maintained within the required temperature range, and the converted reaction product continuously withdrawn from the hotter end of the furnace.

The fibrous pigment titanate-containing calciner discharge is then purified and separated from undesired reaction products through water or acid leaching and the product is further separated by exfoliation. Thereafter it is dried to recover the desired final pigmentary form of fibrous material.

When the herein contemplated pigmenting components are employed in opacifying papers and paints, they advantageously exhibit greater brightness and greater opacity than equivalent quantities of either an alkali metal titanate or titanium dioxide pigment when used alone in such applications. Also compositions made up of the present pigmentary ingredients are less abrasive toward paper-making equipment than titanium dioxide alone. This property of reduced abrasion is particularly advantageous in that it will effectively increase the life of the Fourdrinier wire while cutter blade wear and dusting of sheets during cutting is substantially decreased, as is print plate wear.

The following examples are cited to illustrate the invention. They are not intended to limit it in any manner. In the examples, all parts given are by weight.

Example 1

For purposes of comparison with papers obtained by using a combination pigment comprising alkali-metal titanates and pigmentary titanium dioxide, paper products were first prepared in which separate use was made of these pigments as the pigmenting material. A pulp beater was charged with 445 parts of 4% sulfite pulp-water slurry, then with 7,000 mls. of distilled water and stirred for 4 minutes. To this was added 1.88 parts of fibrous potassium hexatitanate pigment having an $n$ value of about 6, an average diameter of 0.3 micron and lengths ranging between 3 and 30 microns, and an additional 4 minutes of stirring was undertaken. 1.78 parts of 20% starch solution and 17.8 mls. of 4% alum was then added with 4 minutes of stirring being applied for each ingredient.

The resulting slurry was placed into a proportionator and diluted to 12,600 mls. with distilled water, and 8″ x 8″ sheets of paper were then sheeted on a 100 mesh screen in a conventional-type sheeting machine by withdrawing 970 mls. for each sheet. The dry weight for each sheet averaged 1.45 parts, equivalent to 25 lb. ream weight. Loading, opacity, and pigment retention characteristics of these sheets for various loadings are recorded in the following table.

TABLE I

| | Percent potassium titanate | Percent retained | Percent opacity | |
|---|---|---|---|---|
| | | | Waxed | Non-waxed |
| Percent TiO₂: | | | | |
| 10 | | 7.25 | 25 | 61.1 |
| | 2.5 | 29.0 | 19.1 | 59.8 |
| | 5 | 31.3 | 25.2 | 64.0 |
| | 10 | 42.0 | 38.1 | 71.3 |

Using the same papermaking procedure, two additional papers were produced using mixtures of pigmentary fibrous potassium titanates in conjunction with a commercial grade TiO₂ pigment as the pigmenting composition. The potassium titanates used had lengths of 2 to 25 microns and their diameter was about 0.25 micron. The loadings and paper properties were as follows:

TABLE II

| | Percent potassium titanate | Percent retained TiO₂ plus titanate | Percent opacity | |
|---|---|---|---|---|
| | | | Waxed | Non-waxed |
| Percent TiO₂: | | | | |
| 8 | 2 | 17.9 | 28.6 | 59.2 |
| 6 | 4 | 31.5 | 31.5 | 61.4 |

To ascertain the degree of efficiency of potassium titanate alone, and of titanium dioxide alone, as pigmenting agents in paper, as determined by the opacity and light scattering power of the paper, further tests were conducted in which each pigmenting material was used alone at varying loading levels, and in combination with each other. The purpose of these tests was to determine the loading level at which each pigment separately would exhibit its maximum efficiency, and from these results was determined the level at which each pigment should be used in combination with the other to obtain maximum efficiency in the pigment combination, as shown by opacity and light scattering power. In such tests the following was undertaken:

Example 2

As in Example 1, a pulp beater was charged with 445 parts of water slurry containing 18 parts of sulfite pulp and 7,000 parts of distilled water, and stirred for four minutes. To this was added 2% by weight of potassium titanate fibers having an $n$ value of about 6 and an average diameter of 0.3 micron and lengths from about 3 to about 30 microns. The pigmented slurry was stirred for an additional four minutes and 2% alum, based on the pulp weight was added. Again the mix was stirred for four minutes. The slurry thus prepared was placed in a proportionator and diluted to 12.6 liters using distilled water. Using a conventional sheeting machine with a 100 mesh screen, paper sheets 8″ x 8″ each were prepared.

Other papers were prepared according to this same procedure, but using larger amounts of the same potassium titanate as was used in the example described in the previous paragraph. These papers were tested for degree of retention of the pigment in the paper, opacity (unwaxed) according to the procedure described in TAPPI test T–425 M–60 and for light scattering as calculated by the Kebulka-Munk equation. (See Color in Business and Industry, Deane B. Judd, Wiley and Sons, 1961, p. 318.)

The results of these tests are shown in Table III below:

TABLE III

| Percent Potassium Titanate Added (Based on Pulp Wt.) | Percent Pigment Retained | Opacity | Scattering Power of the Paper Sheet, $S_x$ (See Judd) | Scattering Coefficient of Pigment in Sheet (reams/lb.) |
|---|---|---|---|---|
| None | None | 72.0 | 1.79 | |
| 2 | 0.8 | 76.3 | 2.18 | 1.03 |
| 4 | 1.9 | 80.3 | 2.59 | 0.88 |
| 8 | 3.8 | 85.6 | 3.58 | 0.98 |
| 16 | 8.7 | 91.9 | 5.63 | 0.92 |
| 32 | 17.3 | 95.9 | 8.74 | 0.84 |

Using the same procedure for paper making as is described above, but using anatase titanium dioxide pigment alone as the pigmenting material in one instance and rutile titanium dioxide in another, paper sheets were prepared at various pigment levels, based on the pulp weight, as indicated in Tables IV and V respectively where retention of pigment, opacity and light scattering are reported.

TABLE IV

| Percent Anatase TiO$_2$ Added | Percent Pigment Retained | Opacity | Scattering Power of the Paper Sheet, Sx (See Judd) | Scattering Coefficient of Pigment in Sheet (reams/lb.) |
|---|---|---|---|---|
| 3 | 1.2 | 78.3 | 2.35 | 0.98 |
| 5 | 2.2 | 82.0 | 2.90 | 1.05 |
| 10 | 4.5 | 86.9 | 3.77 | 0.92 |
| 20 | 9.4 | 91.6 | 5.45 | 0.81 |
| 40 | 17.2 | 94.8 | 7.59 | 0.71 |

TABLE V

| Percent Rutile TiO$_2$ Added | Percent Pigment Retained | Opacity | Scattering Power of the Paper Sheet, Sx (See Judd) | Scattering Coefficient of Pigment in Sheet (reams/lb.) |
|---|---|---|---|---|
| 3 | 1.2 | 78.6 | 2.47 | 1.17 |
| 5 | 2.2 | 83.1 | 3.09 | 1.22 |
| 10 | 4.6 | 87.6 | 4.01 | 1.00 |
| 20 | 9.1 | 92.7 | 6.00 | 0.96 |
| 40 | 18.7 | 95.2 | 8.64 | 0.77 |

In order to show the efficiency obtained by the use of each of these three pigments separately in light scattering, results have been shown in graph form in the accompanying FIG. 1, in which the values for S represent the light scattering obtained in paper sheet resulting from the use of the pigment alone; that is, the light scattering which results when all other factors except the effect of the pigment are discounted. From this figure, it will be seen that use of rutile titanium dioxide alone as the pigmenting material in paper, results in maximum efficiency of the pigment in light scattering when there is present in the paper sheet from about 1.8% to about 3.2% pigment retained. Maximum efficiency in the use of anatase titanium dioxide is obtained at approximately the same percentage levels. When potassium titanate is used alone as the pigmenting material, it will be seen that maximum efficiency is obtained at from about 3% to about 4.3% pigment retained in the paper. It should be noted also from this figure, that efficiency of rutile titanium dioxide and of anatase titanium dioxide falls off very rapidly in parallel fashion at loading levels greater than the maximums which have been indicated. The fall-off in efficiency of potassium titanate as a pigmenting agent is, on the other hand, very much less abrupt than with titanium dioxide pigments. This appears to result from the unique fibrous nature of pigmentary potassium titanate which prevents the pigment particles from crowding together in the paper sheet which occurs with more nearly spherical pigment particles such as anatase and rutile titanium dioxide. Therefore each pigment particle performs much more efficiently in light scattering at high pigment loadings than does either anatase or rutile alone at equivalent loadings even though the refractive index of titanium dioxide is higher. Because of this unusual effect, certain combinations of TiO$_2$ and pigmentary potassium titanate have been found to provide unexpectedly high light scattering ability. To demonstrate this is so, the results of these tests are shown in the following example.

Example 3

In the same manner as in Example 2, other papers were prepared, but instead of using a single pigment as above, in each case the pigment consisted of a combination of pigmentary potassium titanate (having an $n$ value of about 6, an average diameter of .1–.6 microns and lengths of from about 1 to about 60 microns) with pigmentary anatase or rutile titanium dioxide. In each case, the paper which was prepared contained, as retained pigment, 2 to 3% titanium dioxide (i.e., concentrations of maximum efficiency) together with pigmentary potassium titanate at various levels as shown in Table VI, where the values for Sx (i.e., the scattering power of the paper sheets obtained using the combination of two pigments along with the calculated values for scattering power which would be obtained if each of the TiO$_2$ pigments performed at its maximum efficiency, i.e., without crowding) are reported.

TABLE VI

| Percent Pigment Retained in Paper | | | Scattering Power of the Paper Sheet (Sx) | |
|---|---|---|---|---|
| TiO$_2$ | Potassium titanate | Total | Calculated using Fig. 1 | Actual test result |
| (Anatase): | | | | |
| 2.1 (43%)[1] | 1.6 (57%) | 3.7 | 3.53 | 3.38 |
| 2.2 (51%) | 2.3 (49%) | 4.5 | 3.92 | 3.88 |
| 2.8 (58%) | 3.8 (42%) | 6.6 | 5.57 | 5.07 |
| 3.1 (73%) | 8.5 (27%) | 11.6 | 6.99 | 7.31 |
| (Rutile): | | | | |
| 2.3 (30%) | 1.0 (70%) | 3.3 | 3.58 | 3.66 |
| 2.7 (41%) | 1.9 (59%) | 4.6 | 4.25 | 4.13 |
| 2.9 (58%) | 4.0 (42%) | 6.9 | 5.37 | 5.41 |
| 2.6 (78%) | 9.3 (22%) | 11.9 | 7.38 | 7.73 |

[1] Percent composition of pigment.

Figure 2:
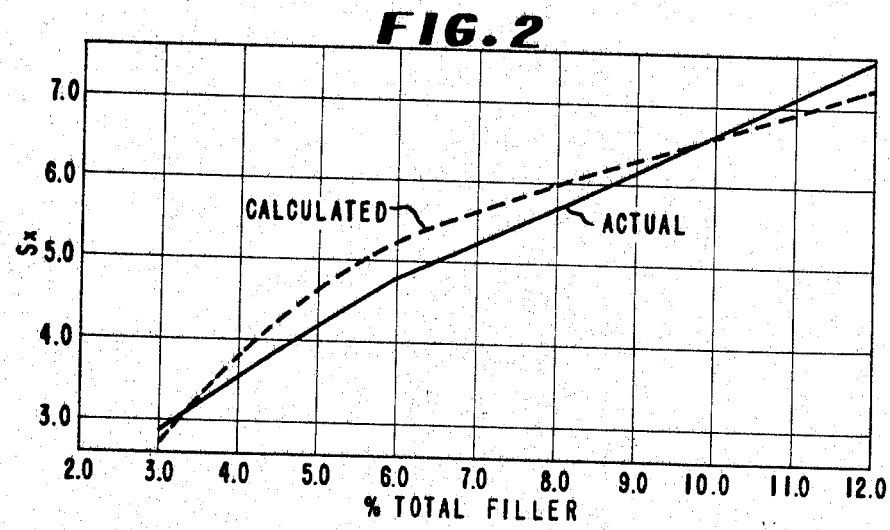
FIGURES 2 and 3 are curves wherein scattering power of the sheet containing the pigment (S$x$) as ordinate is plotted against the total pigment or filler (i.e., compositions of potassium titanate with 2–3% (max. efficiency values) of anatase and rutile respectively) retained in the paper as abscissa. The broken line in each set of curves represents the calculated (using the Kebulka-Munk equation) ideal hiding power to be obtained if the assumption is made that the maximum efficiency of the anatase and rutile is attainable in the presence of the potassium titanate even at high total pigment loadings while the solid line represents the observed hiding power actually attained. These curves are referred to in Example 3.
Figure 3:
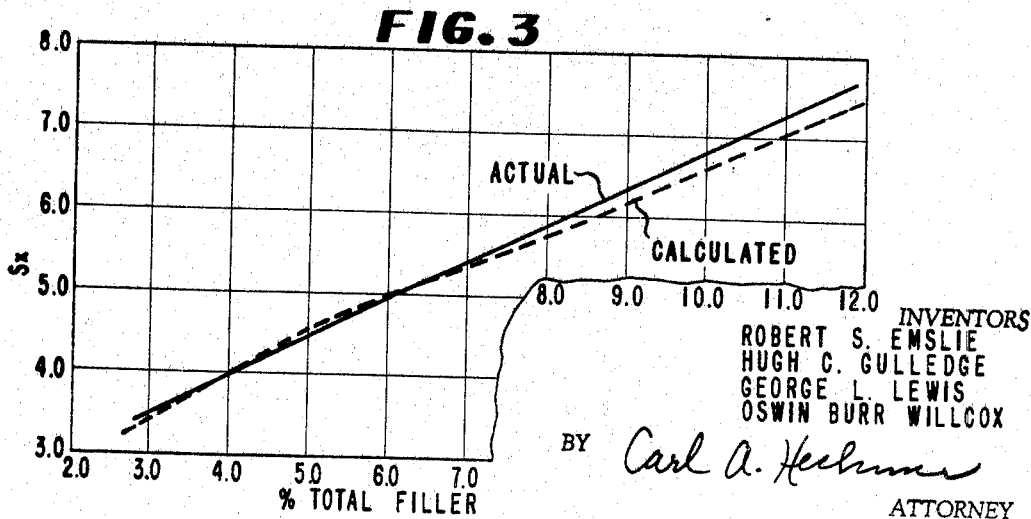

The above results are graphically produced in FIGURES 2 and 3 for anatase and rutile respectively. From these graphs it will be observed that the actual scattering power obtained by the use of the combination pigments in paper closely parallels the value which would be calculated if the TiO$_2$ pigment were functioning at maximum efficiency. The results demonstrate, therefore, that when the addition of titanium dioxide is made at approximately its maximum-efficiency level, potassium titanate pigment can be added up to a level of at least 4% without loss of light scattering power of the combination-pigment due to crowding of the pigment particles.

The results which have been found by testing of papers in which the combination pigment comprising potassium titanate and titanium dioxide is used show that withn certain weight percent limits such combination pigment is advantageous over an equal weight of either pigment used separately.

The use of a combination of pigmentary potassium titanate and pigmentary titanium dioxide as pigmenting ingredient in paints and similar coating compositions over the use of either pigment alone in equivalent amounts has also proved advantageous. However, in the preparation of a paint certain factors are to be considered which need not be taken into account in papermaking. For example, formulating commercially acceptable paints in which the sole pigmenting agent is fibrous pigmentary potassium or other alkali metal titanate is not possible because the fibrous nature of the pigment makes it impossible to use a sufficient amount of it to obtain acceptable hiding power, while still retaining other required properties such as brush-out, scrubability, and film integrity in the paints. It is standard practice in formulating of paints to incorporate in them other solid materials, commonly known as extenders, which contribute to the brushability, scrubability, and film integrity of the paint; but these extenders do very little to provide adequate hiding power in the paint.

Since a fibrous pigmentary alkali metal titanate cannot be satisfactorily used as the sole pigmenting agent in paints, equivalent tests to determine the efficiency of the titanate pigment in exactly the same manner as tests were performed in testing of papers cannot be undertaken. However, in tests which have been carried out, it has been found that the hiding power of paints can be advantageously increased by substituting pigmentary potassium titanate for titanium dioxide as pigmenting material in paints, up to a level of 20% of the total pigment used in the paint even though the refractive index of potassium titanate is lower than that of TiO$_2$. Thus, it is possible to compare a pigment comprising, for example, up to 20% by weight of potassium titanate in combination with TiO$_2$ against paints formulated with use of titanium dioxide as the sole pigmenting agent, as specifically described in the following examples.

Example 4

All paints prepared for testing in this example were prepared according to the following general procedure:

The grind vehicle was placed in a one-quart stainless steel beaker and placed on a conventional (Cowles) Dissolver equipped with a 2″ blade. While mixing at slow speed (1900 r.p.m.) in the Dissolver, dry pigment and extenders were added to the grind vehicle. The Dissolver speed was increased to 5400 r.p.m. for ten minutes, then reduced to 1900 r.p.m. Distilled water was added in an amount of 105 grams, where a combination of $TiO_2$ and potassium titanate pigments was used and 175 grams where $TiO_2$ was used without any titanate. To this slurry 280 grams of Elvacet was added and the mixture was stirred for 5 minutes. The paint was then stirred for 1 hour on a paddle mixer.

To evaluate the paints thus prepared, the paint mixtures were permitted to stand overnight and draw-downs were made using a 4 mil draw down blade with an automatic film applicator on a standard Morest chart. The draw-downs were made and dried overnight under constant humidity conditions. Readings of the draw-downs were made using a Hunter Multi-purpose Reflectometer. The hiding power of the potassium titanate-titanium dioxide blend is expressed as percent of the rutile titanium dioxide control hiding power.

Using the procedure given in the next preceding two paragraphs, 50 PVC emulsion paints were made using the following ingredients:

(1)

| Dry pigment: | Weight, grams |
| --- | --- |
| $TiO_2$ | 200, 190, 180, 170, 160 |
| Potassium titanate | 0, 10, 20, 30, 40 |

(2)

| Extenders: | Weight, grams |
| --- | --- |
| Asbestine | 135.0 |
| Satintone | 50.0 |
| Celite | 30.0 |

(3)

| Grind vehicle: | Weight, grams |
| --- | --- |
| Tamol | 8.0 |
| Colloid 581B | 2.0 |
| Witco 912 | 5.0 |
| Carbitol | 35.0 |
| Diethylene glycol | 15.0 |
| Tergitol | 3.0 |
| Distilled water (60.0 grams for 0% PKT) | 130.0 |
| Cellosize 2% | 150.0 |

In each case the titanium dioxide which was used was commercial pigmentary rutile titanium dioxide. The potassium titanate had an $n$ value of about 6, an average diameter of .1–.6 micron, and lengths of from about 1 to about 60 microns.

When these paints using the combination of pigments were tested according to the procedure described above, the following results were obtained.

| Percent PKT: | Percent Pigmentary Rutile | Hiding Power |
| --- | --- | --- |
| 0 | 100 | 100 |
| 5 | 95 | 108 |
| 10 | 90 | 112 |
| 15 | 85 | 118 |
| 20 | 80 | 122 |

Thus, it will be seen from the above results that the hiding power of emulsion paints is increased when up to 20% by weight of potassium titanate pigment is substituted for an equal part of rutile titanium dioxide pigment used in the paint formulation. Since it has not been found possible to formulate satisfactory paints with more than a 20% substitution of pigmentary potassium titanate for titanium dioxide due to the undesirable effects on other paint properties arising from the fibrous nature of the pigment, titanate substitutions in the pigment in excess are not resorted to where the composite pigment is to be employed in paints and similar protective coatings.

The pigmentary compositions of this invention are particularly useful, as above noted, as inorganic pigmenting ingredients in various applications. In adapting the invention to these applications premixing of the dry ingredients of $TiO_2$ pigment and titanate can be resorted to, or separate addition of the titanate pigment and $TiO_2$ into the coating formulation or the beater or in various locations of the papermaking process can be resorted to. It is preferred, however, that the ingredients be premixed prior to the addition to the coating operation. In order to maintain equal concentrations in the Fourdrinier machine on the felt side of the screen, the wash waters are combined with new pigment in such a manner that the concentrations at the screen remains relatively constant with respect to titanium dioxide and fibrous titanates. Additions must be adjusted periodically for the fibrous titanate materials since normally the fibrous titanate is retained by the pulp in greater quantities than the titanium dioxide. Normally, however, the ratio in the paper of titanate to $TiO_2$ is approximately the same as that which exists in the beater mix. The presence of fibrous titanates increases the $TiO_2$ retention and thereby tends to maintain a ratio in the paper which is equivalent to the ratio in the beater mix. In paper manufacture applications the pigmenting combination herein contemplated advantageously reduces costs and imparts high, increased opacity and brightness characteristics to the paper without any appreciable decrease in bursting strength. In addition the paper product exhibits improved printability, especially in offset printing applications. The pigment is adaptable for use in any type of papermaking which generally involves mixing the pigment, starch and other desired paper ingredients with the pulp slurry and preferably after the pulp has been suitably beaten in accordance with usual papermaking practice. Since the pigment disperses easily in paper pulp and is not seriously affected by the dispersing action of starch, much greater pigment retention in the sheet results than with $TiO_2$ alone when starch is present.

The improvements thus afforded by reason of $TiO_2$-titanate pigment employment in papermaking will vary somewhat depending on the pulps used but generally enhancement in opacity and other desired paper characteristics will inherently result with the use of all pulps and combinations. Following dispersion of the pigment in the pulp, the pH of the slurry is adjusted to within the range 4.5 to 6.5, and preferably to about pH of 5, by adding a flocculating agent such as aluminum sulfate, a salt of sulfuric acid or sulfuric acid per se. The acidified slurry is then transferred to the head box of a conventional papermaking apparatus, e.g., a Fourdrinier or cylinder machine and is sheeted into paper.

Although titanates with $TiO_2/M_2O$ stoichiometry of 5/1 to 8/1 are preferred for use in such applications, the tetratitanates of potassium and sodium as well as sodium and potassium hexatitanates or mixture of such titanates are also advantageously useful. Potassium hexatitanate fibers within the average diameter from 0.1 to 0.4 micron with lengths of 1–40 microns afford retention and overall pigment properties and hence are especially useful. For optimum retention, dispersion and opacity, preferred diameter and length sizes for either sodium or potassium fibrous titanates comprise from 0.2 to 0.3 micron in diameter and lengths of from 2 to 30 microns.

Sufficient pigment is added to the pulp to constitute from about 0.5 to 30% of the pulp on a dry basis. Ash values of the paper, by virtue of the high pigment retention obtained, will range from about 20% to 65% or 80% of the pigment concentration in the slurry on a dry pulp basis.

Many equivalent modifications of the present invention will become apparent to those skilled in the art from a reading of the above without a departure from the inventive concept.

What is claimed is:

1. As a new opacifying pigment composition, a mixture of from about 22 to 97% by weight of pigmentary titanium dioxide and from about 3 to 78% by weight of pigmentary fibrous alkali metal titanate corresponding to the formula $M_2O(TiO_2)_n$ wherein $n$ is 4-9 and M is an alkali metal, the particles of said titanate having a diameter ranging from 0.1–0.6 micron and a fiber length of from 10–100 times said diameter.

2. The opacifying pigment composition of claim 1 wherein the alkali metal titanate is pigmentary fibrous potassium titanate corresponding to the formula $K_2O(TiO_2)_n$ wherein $n$ is 4-9.

3. The opacifying pigment composition of claim 1 wherein the alkali metal titanate is pigmentary sodium titanate corresponding to the formula $Na_2O(TiO_2)_n$ wherein $n$ is 4-9.

4. The opacifying pigment composition of claim 1 wherein the alkali metal titanate is a mixture of pigmentary fibrous alkali metal titanates corresponding to the formula $Na_2O(TiO_2)_n$ and $K_2O(TiO_2)_n$ herein $n$ equals 4-9.

5. The composition of claim 1 wherein from about 3% to 20% by weight of alkali metal titanate and from about 80% to 97% by weight of $TiO_2$ is present.

References Cited

UNITED STATES PATENTS

| 2,833,620 | 5/1958 | Gier et al. | |
| 2,841,470 | 7/1958 | Berry. | |
| 3,129,105 | 4/1964 | Berry et al. | 106—299 XR |
| 3,258,392 | 6/1966 | Brill | 106—299 XR |

TOBIAS E. LEVOW, Primary Examiner

H. M. S. SNEED, Assistant Examiner

U.S. Cl. X.R.

106—299; 162—181; 260—29.6